United States Patent
Jorguseski et al.

(10) Patent No.: US 11,324,019 B2
(45) Date of Patent: May 3, 2022

(54) SELECTING A SUBSET OF FREQUENCY RESOURCES BASED ON MEASUREMENTS OF CANDIDATE FREQUENCY RESOURCES

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Ljupco Jorguseski, Rijswijk (NL); Haibin Zhang, Voorburg (NL); Konstantinos Trichias, Athens (GR); Remco Litjens, Voorschoten (NL)

(73) Assignees: KONINKLIKE KPN N.V., Rotterdam (NL); NEDERLANDSE ORGANISATIE VOOR TOEGEPAST-NATUURWETEN-SCHAPPELIJK ONDERZOEK TNO, 'S-Gravenhage (NL)

( * ) Notice: Subject to any disclaimer, the term of this patent is extended or adjusted under 35 U.S.C. 154(b) by 111 days.

(21) Appl. No.: 16/631,710

(22) PCT Filed: Jul. 20, 2018

(86) PCT No.: PCT/EP2018/069709
§ 371 (c)(1),
(2) Date: Jan. 16, 2020

(87) PCT Pub. No.: WO2019/016350
PCT Pub. Date: Jan. 24, 2019

(65) Prior Publication Data
US 2020/0170026 A1    May 28, 2020

(30) Foreign Application Priority Data
Jul. 21, 2017   (EP) ..................... 17182498

(51) Int. Cl.
*H04W 4/00*   (2018.01)
*H04L 5/04*   (2006.01)
(Continued)

(52) U.S. Cl.
CPC ....... *H04W 72/1231* (2013.01); *H04L 1/0026* (2013.01); *H04L 1/0073* (2013.01);
(Continued)

(58) Field of Classification Search
CPC ............. H04W 72/1231; H04W 24/10; H04W 72/0413; H04W 72/042; H04L 1/0026; H04L 1/0073; H04L 5/0053
See application file for complete search history.

(56) References Cited

U.S. PATENT DOCUMENTS 10,524,244 B2 * 12/2019 Tsai ..................... H04B 7/0617
10,785,759 B2 *  9/2020 Lin ....................... H04L 5/0094
(Continued)

FOREIGN PATENT DOCUMENTS

WO   WO 2009/047740 A2    4/2009
WO   WO 2010/143821 A2   12/2010

OTHER PUBLICATIONS

Extended European Search Report for European Application No. 17182498.0, Entitled "Selecting a Subset of Frequency Resources Based on Measurements of Candidate Frequency Resources", dated Jan. 24, 2018, 8 pages.
(Continued)

*Primary Examiner* — Brian T O Connor
(74) *Attorney, Agent, or Firm* — Hamilton, Brook, Smith & Reynolds, P.C.

(57) ABSTRACT

A method of scheduling transmissions to client devices comprises receiving feedback (f1a-f3d) about a plurality of candidate downlink frequency resources (91-94) from a plurality of client devices and/or measuring channel quali-
(Continued)

ties of a plurality of candidate uplink frequency resources (95-98) from receptions of transmissions, e.g. of the feedback, by the plurality of client devices. The method further comprises selecting a subset (92) of the plurality of candidate downlink frequency resources and/or a subset (96) of the plurality of the candidate uplink frequency resources based on the received feedback and/or the measured channel qualities. The method further comprises scheduling transmissions (dd1-3) to the client devices on the selected subset of candidate downlink frequency resources and/or transmissions (ud1-3) from the client devices on the selected subset of uplink frequency resources.

14 Claims, 13 Drawing Sheets

(51) Int. Cl.
*H04W 72/12* (2009.01)
*H04L 1/00* (2006.01)
*H04L 5/00* (2006.01)
*H04W 24/10* (2009.01)
*H04W 72/04* (2009.01)

(52) U.S. Cl.
CPC ........... *H04L 5/0053* (2013.01); *H04W 24/10* (2013.01); *H04W 72/042* (2013.01); *H04W 72/0413* (2013.01)

(56) References Cited

U.S. PATENT DOCUMENTS

| | | | |
|---|---|---|---|
| 10,812,238 B2* | 10/2020 | Zhang | H04B 7/024 |
| 2012/0039199 A1 | 2/2012 | Wanshi et al. | |
| 2016/0286556 A1 | 9/2016 | Titus et al. | |
| 2017/0230961 A1* | 8/2017 | Park | H04L 5/0055 |
| 2017/0331577 A1* | 11/2017 | Parkvall | H04J 11/0079 |
| 2017/0353976 A1* | 12/2017 | Yerramalli | H04L 5/0057 |
| 2018/0262242 A1* | 9/2018 | Chakraborty | H04B 7/063 |
| 2018/0376484 A1* | 12/2018 | Beale | H04W 72/0473 |
| 2019/0215710 A1* | 7/2019 | Yi | H04L 5/0057 |
| 2019/0239170 A1* | 8/2019 | Thangarasa | H04W 52/365 |
| 2019/0387409 A1* | 12/2019 | Thangarasa | H04W 16/00 |
| 2020/0037367 A1* | 1/2020 | Kim | H04W 74/006 |
| 2020/0220677 A1* | 7/2020 | Interdonato | H04L 5/0048 |

OTHER PUBLICATIONS

International Search Report and Written Opinion for International Application No. PCT/EP2018/069709, Entitled "Selecting a Subset of Frequency Resources Based on Measurements of Candidate Frequency Resources", dated Sep. 26, 2018, 14 pages.

* cited by examiner

SELECTING A SUBSET OF FREQUENCY RESOURCES BASED ON MEASUREMENTS OF CANDIDATE FREQUENCY RESOURCES

RELATED APPLICATIONS

This application is the U.S. National Stage of International Application No. PCT/EP2018/069709, filed Jul. 20, 2018, which designates the U.S., published in English, and claims priority under 35 U.S.C. § 119 or 365(c) to European Application No. 17182498.0, filed Jul. 21, 2017. The entire teachings of the above applications are incorporated herein by reference.

FIELD OF THE INVENTION

The invention relates to a system for scheduling transmissions to client devices and a client device for transmitting feedback to said system.

The invention further relates to a method of scheduling transmissions to client devices and a method of transmitting feedback.

The invention also relates to a computer program product enabling a computer system to perform such methods.

BACKGROUND OF THE INVENTION

Narrowband Internet of Things (NB-IoT) has been specified in 3GPP Release 13 with the aim to efficiently support IoT applications in LTE-based mobile networks with the requirements of deep indoor coverage, low complexity, low cost devices and long device battery life, amongst others.

There are two types of NB-IoT carriers specified in 3GPP Release 13, each occupying a bandwidth of 180 kHz, the same as one LTE Physical Resource Block (i.e. 12 OFDM sub-carriers each with 15 kHz width): anchor carriers and non-anchor carriers. An anchor carrier carries all the common control channels for NB-IoT (for the delivery of system information, synchronization, etc.). There could be one or more anchor carriers dedicated to NB-IoT applications. A non-anchor carrier does not carry the common control channels of NB-IoT. In case the in-band operation mode of NB-IoT is used, the LTE Physical Resource Block (PRB) of the non-anchor carrier is not dedicated to NB-IoT, i.e. it can be shared by NB-IoT client devices (a client device is referred to as "User Equipment" or "UE" in LTE) and regular (not NB-IoT capable) LTE client devices via PRB resource allocation done by e.g. a joint scheduler.

An idle NB-IoT client device camps on an anchor NB-IoT carrier and uses it for setting up the connection (i.e. paging and RACH procedure). During the connection set-up process (i.e. when transiting from RRC_Idle to RRC_Connected mode), the NB-IoT client device might be allocated an anchor or non-anchor NB-IoT carrier for its transmission/reception of data.

Typically, an LTE carrier is wideband and the radio propagation condition is frequency-selective. At the exact locations of static client devices, the receive wideband signal may experience a "dip" at some Physical Resource Blocks (assuming the in-band mode operation mode of NB-IoT is used), while it might experience much better radio condition at some other PRBs. Typically, each static client device experiences the frequency-selective channel differently: when for one static client device the PRB is in a "dip", the same PRB might have relatively very strong radio channel response for another static client device. For mobile devices, the radio channel quality of particular PRB is varying over time due to its mobility and if a PRB may experience a "dip" this is temporary and changes as the devices move around in the coverage area of the NB-IoT system.

In LTE, a scheduler assigns frequency and time resources as PRBs to a client device as soon as there is data to transmit by or to the client device. The smallest scheduling time interval is the transmission time interval (TTI). The most advanced resource assignment available in LTE is the so-called 'channel aware' time-frequency scheduling. For the downlink, the scheduler learns the time-frequency fading per client device via channel quality information (CQI) feedback from the client device. Ideally, this feedback is per PRB. For the uplink, the scheduler residing at the base station learns the time-frequency fading per client device via so-called sounding reference signal (SRS) transmission per client device. The SRS is a pilot signal transmitted over the whole frequency band of the LTE carrier (e.g. a 10 MHz band) so the scheduler can measure the channel for that client device in each PRB. Based on the time-frequency fading information determined for a client device, the scheduler assigns the PRBs that are 'best' for this client device to this client device.

Although 'channel aware' time-frequency scheduling takes the time-frequency fading per client device into account, which frequency resources are used for anchor and non-anchor NB-IoT carriers is configured by operators manually. As a result, the frequency-selective radio channels are not taken into account sufficiently. This is especially a problem for static client devices experiencing poor radio conditions (e.g. client devices installed at fixed locations deep in a building), as these client devices may experience unchanged radio conditions during the whole data transmission.

SUMMARY OF THE INVENTION

It is a first object of the invention to provide a system for scheduling transmissions to client devices, which already takes into account frequency-selective radio channels before scheduling takes place.

It is a second object of the invention to provide a client device for transmitting feedback to a system, which allows said system to already take into account frequency-selective radio channels before scheduling takes place.

It is a third object of the invention to provide a method of scheduling transmissions to client devices, which already takes into account frequency-selective radio channels before scheduling takes place.

It is a fourth object of the invention to provide a method of transmitting feedback to a system, which allows said system to already take into account frequency-selective radio channels before scheduling takes place.

According to the invention, the first object is realized in that the system comprises at least one receiver and at least one processor configured to use said at least one receiver to receive feedback about a plurality of candidate downlink frequency resources from a plurality of client devices and/or measure channel qualities of a plurality of candidate uplink frequency resources from receptions of transmissions by said plurality of client devices, select a subset of said plurality of candidate downlink frequency resources and/or a subset of said plurality of candidate uplink frequency resources based on said received feedback and/or said measured channel qualities, and schedule transmissions to said plurality of client devices on said selected subset of candidate downlink frequency resources and/or transmissions from said plurality of client devices on said selected subset of uplink frequency resources.

By selecting a subset of frequency resources from candidate frequency resources based on measurements by a plurality of client devices and/or by measuring transmissions of a plurality of client devices, frequency resources may be automatically instead of manually selected while taking into account frequency-selective radio channels in this selection step, so before scheduling takes place. Thus, the real deployment environment of client devices is taken into account and better overall performance is achieved. Moreover, an optimized frequency resource selection may lead to increased spectral efficiency and reduced power consumption by the client devices.

A frequency resource may be a frequency band, for example. The candidate downlink frequency resources may comprise contiguous and/or non-contiguous frequency bands. The candidate uplink frequency resources may comprise contiguous and/or non-contiguous frequency bands. Said system may further comprise at least one transmitter and said at least one processor may be configured to use said at least one transmitter to transmit wireless signals on said plurality of candidate downlink frequency resources.

Said plurality of client devices may comprise one or more idle client devices. By not only selecting a subset of frequency resources from candidate frequency resources based on measurements by active client devices and/or by measuring transmissions of active client devices, but also based on measurements by idle client devices and/or by measuring transmissions of idle client devices (e.g. when triggered to report on signal quality of candidate frequency resources), the selection may take into account more client devices. This is especially beneficial when the idle client devices are static and are thus going to be in the same location when they are active as when they are idle.

Said at least one processor may be configured to use said at least one receiver to receive said feedback about said plurality of candidate downlink frequency resources on said plurality of candidate uplink frequency resources and measure said channel quality of said plurality of candidate uplink frequency resources from receptions of said feedback on said plurality of candidate uplink frequency resources. This makes it unnecessary for the client devices to transmit pilot signals like the sounding reference signals transmitted when using 'channel aware' time-frequency scheduling in uplink, and thereby reduces overhead.

At least one of said plurality of candidate downlink frequency resources may be paired with at least one of said plurality of candidate uplink frequency resources and said at least one processor may be configured to use said at least one receiver to receive said feedback about said at least one candidate downlink frequency resource on the at least one candidate uplink frequency resource paired with said at least one candidate downlink frequency resource. Thus, in case a pair of uplink and downlink frequency resources, i.e. an uplink frequency resource with a pre-defined relative frequency offset compared to a downlink frequency resource, is used and the system receives feedback on the uplink frequency resource, the system knows that the feedback relates to the paired downlink frequency resource.

Said feedback may comprise an identification of one or more candidate downlink frequency resources to which said feedback relates. In case an uplink frequency resource has not been paired with a downlink frequency resource, this identification allows the system to identify to which downlink frequency resource feedback from a client device on this uplink frequency resource relates. Thus, the assigned downlink and uplink frequency resources do not necessarily need to be paired.

At least one of said plurality of candidate downlink frequency resources may be paired with at least one of said plurality of candidate uplink frequency resources and said at least one processor may be configured to determine at least one combined quality for at least one pair of candidate downlink and uplink frequency resources and select a subset of said plurality of candidate downlink frequency resources and a subset of said plurality of candidate uplink frequency resources based on said at least one combined quality. If the assigned downlink and uplink frequency resources need to be paired, then the selection should preferably consider the uplink and downlink jointly, i.e. determine and use a combined/joint quality measure for a paired downlink frequency resource and uplink frequency resource.

Said at least one processor may be further configured to schedule transmissions to a mobile client device on said selected subset of candidate downlink frequency resources and/or transmissions from said mobile client device on said selected subset of uplink frequency resources, said selected subset of candidate downlink frequency resources not being based on feedback received from said mobile client device and/or said selected subset of candidate uplink frequency resources not being based on a channel quality measured from a reception of a transmission by said mobile device. As mobile client devices normally experience changing radio conditions during the whole data transmission, statically configured/selected frequency resources are less of a problem for mobile client devices. This is because a 'dip' in the quality of the radio conditions for a particular frequency resource is of temporary nature due to the device mobility. It is therefore not necessary to select a subset of downlink frequency resources based on feedback received from a mobile client device and/or select a subset of uplink frequency resources based on a channel quality measured based on a reception of a transmission by a mobile device.

Said wireless signals transmitted by said at least one processor using said at least one transmitter on said plurality of candidate downlink frequency resources may be pilot signals. Said pilot signals may be narrowband reference signals or cell specific reference signals, for example. Measurements on pilot signals are well known and therefore easy to implement.

Said at least one processor may be configured to use said at least one transmitter to inform said plurality of client devices of at least one time at which it will start transmitting said wireless signals on said plurality of candidate downlink frequency resources. Since transmitting the wireless signals on many candidate downlink frequency resources would use a significant amount of resources, it would not be efficient to transmit the wireless signals continuously. Instead, the wireless signals may be transmitted at certain times. These times, e.g. the first minute of every hour or every second hour, may be communicated to the client devices or, alternatively, configured in advance.

According to the invention, the second object is realized in that the client device comprises at least one receiver, at least one transmitter, and at least one processor configured to use said at least one receiver to measure at least one channel quality of at least one candidate downlink frequency resource from at least one reception of at least one transmission by a transmitting system on said at least one candidate downlink frequency resource, and use said at least one transmitter to transmit feedback based on one or more of said at least one measured channel quality to said transmitting system on a plurality of candidate uplink frequency resources. As this allows the system to measure the channel qualities of the candidate uplink frequency resources based on receptions of the feedback, it is unnecessary for the client device to transmit pilot signals like the sounding reference signals transmitted when using 'channel aware' time-frequency scheduling in uplink, and thereby reduces overhead.

According to the invention, the third object is realized in that the method of assigning frequency resources to a plurality of client devices comprises receiving feedback about a plurality of candidate downlink frequency resources from a plurality of client devices and/or measuring channel qualities of a plurality of candidate uplink frequency resources from receptions of transmissions by said plurality of client devices, selecting a subset of said plurality of candidate downlink frequency resources and/or a subset of said plurality of said candidate uplink frequency resources based on said received feedback and/or said measured channel qualities, and scheduling transmissions to said plurality of client devices on said selected subset of candidate downlink frequency resources and/or transmissions from said plurality of client devices on said selected subset of uplink frequency resources. Said method may be performed by software running on a programmable device. This software may be provided as a computer program product.

According to the invention, the fourth object is realized in that the method of transmitting feedback comprises measuring at least one channel quality of at least one candidate downlink frequency resource from at least one reception of at least one transmission by a transmitting system on said at least one candidate downlink frequency resource and transmitting feedback based on one or more of said at least one measured channel quality to said transmitting system on a plurality of candidate uplink frequency resources. Said method may be performed by software running on a programmable device. This software may be provided as a computer program product.

Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: receiving feedback about a plurality of candidate downlink frequency resources from a plurality of client devices and/or measuring channel qualities of a plurality of candidate uplink frequency resources from receptions of transmissions by said plurality of client devices selecting a subset of said plurality of candidate downlink frequency resources and/or a subset of said plurality of said candidate uplink frequency resources based on said received feedback and/or said measured channel qualities, and scheduling transmissions to said plurality of client devices on said selected subset of candidate downlink frequency resources and/or transmissions from said plurality of client devices on said selected subset of uplink frequency resources.

A non-transitory computer-readable storage medium stores at least a second software code portion, the second software code portion, when executed or processed by a computer, being configured to perform executable operations comprising: measuring at least one channel quality of at least one candidate downlink frequency resource from at least one reception of at least one transmission by a transmitting system on said at least one candidate downlink frequency resource and transmitting feedback based on one or more of said at least one measured channel quality to said transmitting system on a plurality of candidate uplink frequency resources.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
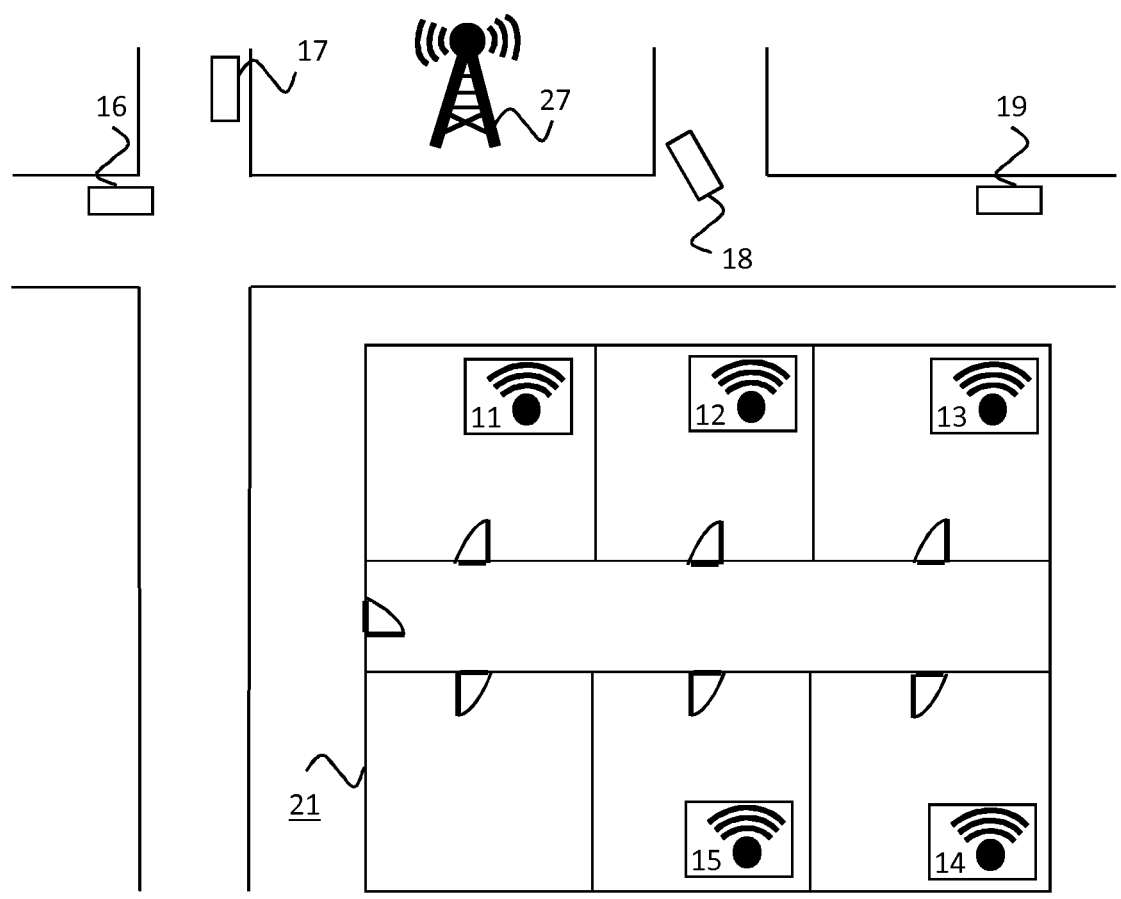
FIG. 1 depicts an environment comprising embodiments of a system and client devices of the invention.

FIG. 1 depicts an environment comprising an embodiment of the system for scheduling transmissions to client devices, base station 1 (e.g. an LTE eNodeB), and embodiments of the client devices for transmitting feedback, static client devices 11-15. In FIG. 1, the static client devices 11-15 are located in a building 21 and mobile client devices 16-19 are vehicles driving on a road.

Figure 2:
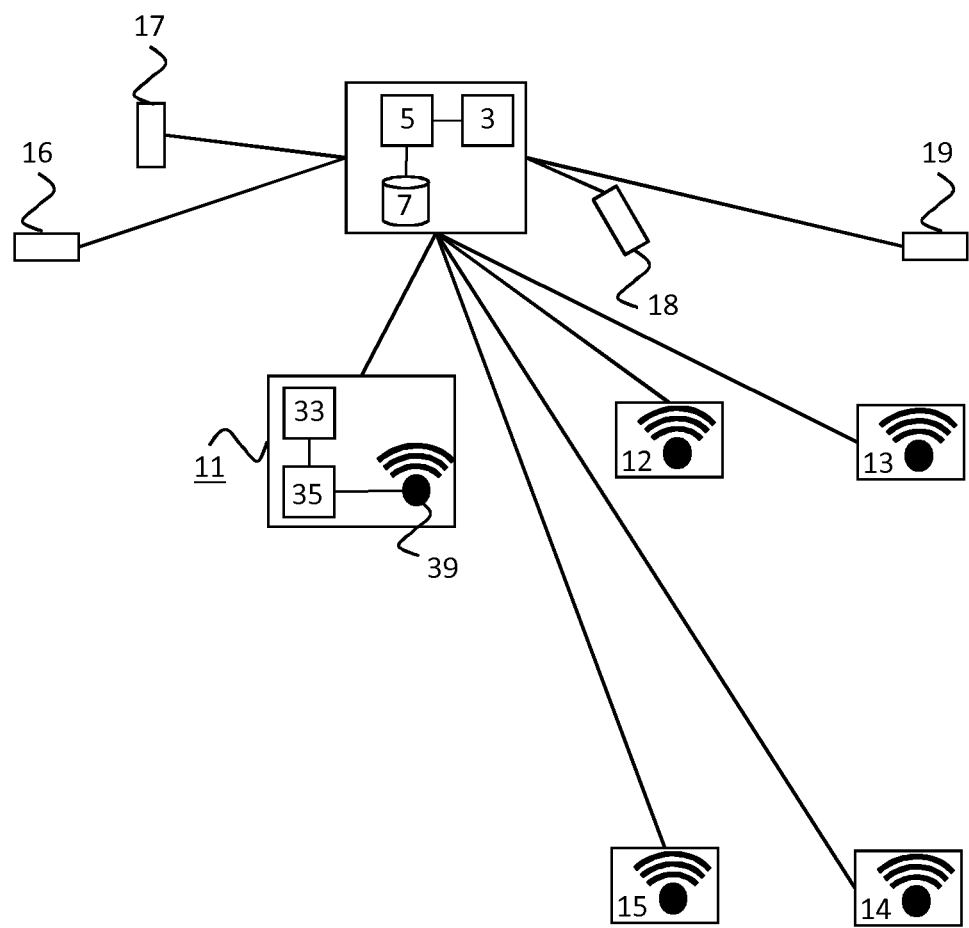
FIG. 2 is a block diagram of the system and one of the client devices of FIG. 1.

The base station 1 comprises a transceiver 3 and a processor 5, see FIG. 2. The processor 5 is configured to use the transceiver 3 to receive feedback about a plurality of candidate downlink frequency resources from the plurality of static client devices 11-15 and/or measure channel qualities of a plurality of candidate uplink frequency resources from receptions of transmissions by the plurality of static client devices 11-15. The plurality of static client devices 11-15 comprises one or more active client devices and one or more idle client devices. The processor 5 is further configured to select a subset of the plurality of candidate downlink frequency resources and/or a subset of the plurality of candidate uplink frequency resources based on the received feedback and/or the measured channel qualities. The processor 5 is further configured to schedule transmissions to the plurality of client devices on the selected subset of candidate downlink frequency resources and/or transmissions from the plurality of static client devices 11-15 on the selected subset of uplink frequency resources. In the embodiment of FIG. 2, the base station 1 further comprises storage means 7, e.g. for storing the selection/configuration and/or the schedule.

The selected uplink frequency resource(s) and the selected downlink frequency resource(s) may be used as NB-IoT anchor carriers, for example. The selected uplink frequency resource(s) and the selected downlink frequency resource(s) may optionally be used as NB-IoT non-anchor carriers. Alternatively, the above-mentioned measurements and/or feedback may be re-used or measurements may be performed and feedback may be transmitted in the same manner to determine on which non-anchor carrier(s) to schedule transmissions.

The static client device 11 comprises a transceiver 33 and a processor 35, see FIG. 2. The processor 35 is configured to use the transceiver 33 to measure at least one channel quality of at least one candidate downlink frequency resource from at least one reception of at least one transmission by the base station 1 on the at least one candidate downlink frequency resource. The processor 35 is further configured to use the transceiver 33 to transmit feedback based on one or more of the at least one measured channel quality to the base station 1 on a plurality of candidate uplink frequency resources. The static client devices 12-15 comprise a transceiver and a processor configured as described above. In the embodiment of FIG. 2, the static client device 11 further comprises a sensor 39. The static client devices 12-15 comprise a similar sensor. These sensors may be smart electricity sensors, for example.

In the embodiment of FIG. 2, the processor 5 is configured to use the transceiver 3 to receive the feedback about the plurality of candidate downlink frequency resources on the plurality of candidate uplink frequency resources and measure the channel quality of the plurality of candidate uplink frequency resources from receptions of the feedback on the plurality of candidate uplink frequency resources.

In the embodiment of FIG. 2, the processor 5 is configured to use the receiver 3 to receive the feedback about at least one candidate downlink frequency resource on the at least one candidate uplink frequency resource paired with the at least one candidate downlink frequency resource, if such a pairing has been specified. The feedback comprises an identification of one or more candidate downlink frequency resources to which the feedback relates when the feedback is transmitted on an unpaired candidate uplink frequency resource.

The processor 5 is further configured to determine at least one combined quality for at least one pair of candidate downlink and uplink frequency resources and select a subset of the plurality of candidate downlink frequency resources and a subset of the plurality of candidate uplink frequency resources based on the at least one combined quality if such a pairing has been specified. Separate (e.g. channel) qualities may be used for non-paired candidate downlink and uplink frequency resources. In practice, most likely either all candidate downlink and uplink frequency resources are paired or none of them is paired.

The processor 5 is further configured to schedule transmissions to mobile client devices 16-19 on the selected subset of candidate downlink frequency resources and transmissions from the mobile client devices 16-19 on the selected subset of uplink frequency resources. The selected subset of candidate downlink frequency resources is not based on feedback received from the mobile client devices 16-19. The selected subset of candidate uplink frequency resources is not based on a channel quality measured from a reception of a transmission by the mobile client devices 16-19.

The processor 5 is configured to use the transceiver 3 to transmit wireless signals, specifically pilot signals, on the plurality of candidate downlink frequency resources. The processor 5 is configured to use the transceiver 3 to inform the plurality of static client devices 11-15 of at least one time at which it will start transmitting the wireless signals on the plurality of candidate downlink frequency resources.

In the embodiment shown in FIG. 2, the base station 1 comprises one processor 5. In an alternative embodiment, the base station 1 comprises multiple processors. The processor 5 of the base station 1 may be a general-purpose processor, e.g. an Intel or an AMD processor, or an application-specific processor, for example. The processor 5 may comprise multiple cores, for example. The processor 5 may run a Unix-based or Windows operating system, for example. The transceiver 3 of the base station 1 may use one or more cellular communication technologies such as GPRS, CDMA, UMTS, NB-IoT and/or LTE to communicate with the client devices 11-19, for example. In the embodiment shown in FIG. 2, a receiver and a transmitter are combined in the transceiver 3 of the base station 1. In an alternative embodiment, the base station 1 comprises a receiver and a transmitter that are separate. The storage means 7 may comprise solid state memory, e.g. one or more Solid State Disks (SSDs) made out of Flash memory, or one or more hard disks, for example. The base station 1 may comprise other components typical for a component in a mobile communication network, e.g. a power supply, or typical for a base station, e.g. an array of antennas. In the embodiment shown in FIG. 2, the base station 1 comprises one device. In an alternative embodiment, the base station 1 comprise multiple devices.

In the embodiment shown in FIG. 2, the static client device 11 comprises one processor 35. In an alternative embodiment, the static client device 11 comprises multiple processors. The processor 35 may be a general-purpose processor, e.g. an ARM processor, or an application-specific processor. The processor 35 may run a Unix-based operating system, for example. The transceiver 33 of the static client device 11 may use one or more cellular communication technologies such as e.g. GPRS, CDMA, UMTS, NB-IoT (Narrow Band-Internet of Things) and/or LTE to communicate with the base station 1, for example. In the embodiment shown in FIG. 2, a receiver and a transmitter are combined in the transceiver 33 of the static client device 11. In an alternative embodiment, the static client device 11 comprises a receiver and a transmitter that are separate. The sensor 39 may comprise one or more cameras and/or one or more microphones, for example. The static client device 11 may comprise other components typical for a client device, e.g. a battery.

In the embodiment shown in FIG. 2, the system for scheduling transmissions to client devices is a base station. In an alternative embodiment, the system may comprise a base station plus one or more other components/functions of a mobile communication network, e.g. plus a physical or virtual node which schedules transmissions to client devices. The system may comprise multiple base stations distributed over multiple sites or one base station working with multiple distributed antennas at different locations (Remote Radio Head (RRH) concept), for example.

Figure 3:
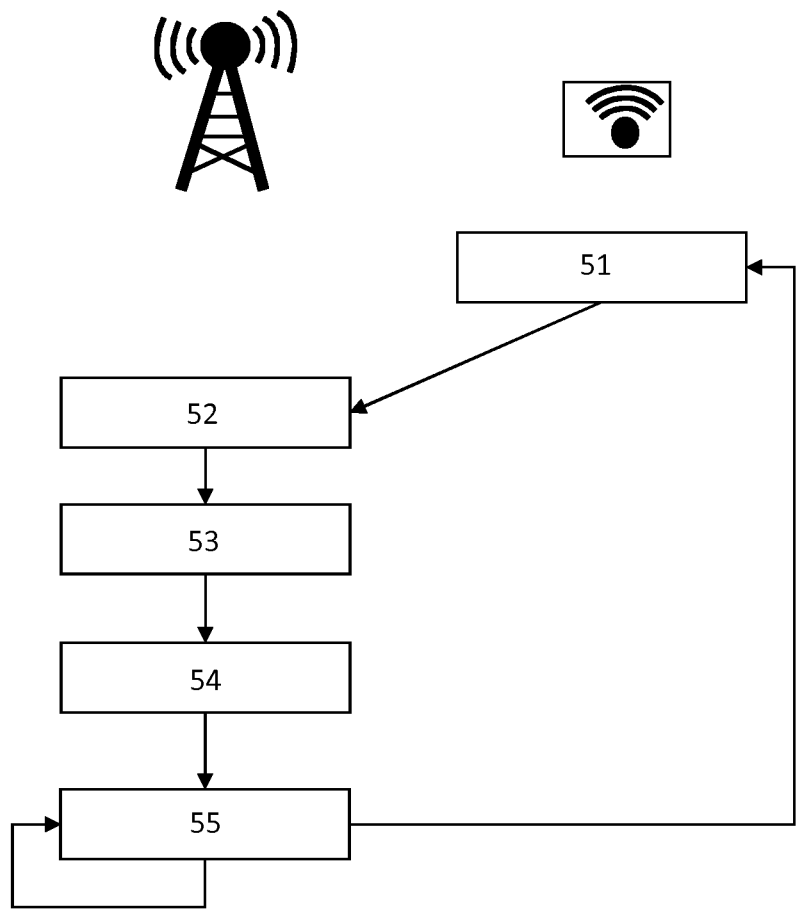
FIG. 3 is a flow diagram of a first embodiment of the methods of the invention.

First embodiments of the method of scheduling transmissions to client devices and the method of transmitting feedback are shown in FIG. 3. A step 51 comprises a client device transmitting pilot signals (e.g. LTE Sounding Reference Signals or pilot signals similar to LTE Sounding Reference Signals) to a base station on a plurality of candidate uplink frequency resources. In the embodiments of FIGS. 3 to 12, the uplink frequency resources are frequency bands allocated as LTE Physical Resource Blocks (PRBs). LTE uses Orthogonal Frequency-Division Multiplexing (OFDM) in which a large number of closely spaced orthogonal sub-carrier signals are used to carry data in parallel. In an alternative embodiment, resources may be allocated to users in a different way. In the embodiments of FIGS. 3 to 12, the selected uplink frequency resources are used as NB-IoT carriers.

Figure 5:
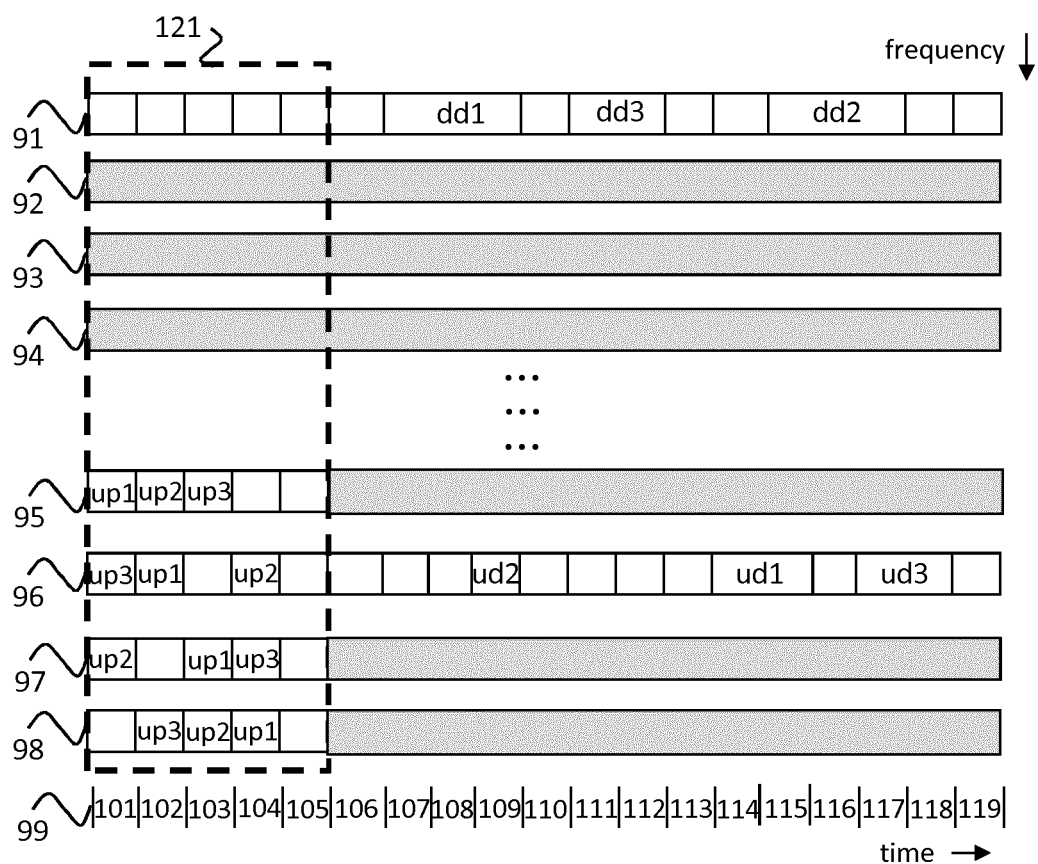
FIG. 5 shows a first example of a resource allocation in relation to FIG. 3.

Step 51 is carried out in stage 121 shown in FIG. 5. Stage 121 corresponds to time slots 101-105 in FIG. 5. Time slots 101-119 are indicated on timeslot bar 99. In time slot 101, static client device UE1 transmits a pilot signal (up1) to the base station on candidate uplink NB-IoT carrier 95, static client device UE3 transmits a pilot signal (up3) to the base station on candidate uplink NB-IoT carrier 96, and static client device UE2 transmits a pilot signal (up2) to the base station on candidate uplink NB-IoT carrier 97. In time slot 102, UE2 transmits a pilot signal (up2) to the base station on candidate uplink NB-IoT carrier 95, UE1 transmits a pilot signal (up1) to the base station on candidate uplink carrier 96, and UE3 transmits a pilot signal (up3) to the base station on candidate uplink NB-IoT carrier 98.

In time slot 103, UE3 transmits a pilot signal (up3) to the base station on candidate uplink NB-IoT carrier 95, UE1 transmits a pilot signal (up1) to the base station on candidate uplink NB-IoT carrier 97, and UE2 transmits a pilot signal (up2) to the base station on candidate uplink NB-IoT carrier 98. In time slot 104, UE2 transmits a pilot signal (up2) to the base station on candidate uplink NB-IoT carrier 96, UE3 transmits a pilot signal (up3) to the base station on candidate uplink NB-IoT carrier 97, and UE1 transmits a pilot signal (up1) to the base station on candidate uplink NB-IoT carrier 98. In the embodiment of FIG. 5 (and also in the embodiments of FIGS. 6 and 9-12), UE1 to UE3 do not transmit simultaneously on a single candidate uplink NB-IoT carrier. In an alternative embodiment, multiple of the UEs transmit on a single candidate uplink NB-IoT carrier simultaneously in at least one time slot. This may be used to reduce the length of stage 121 of FIG. 5 (and stage 125 of FIG. 6 and stage 127 of FIGS. 9-12).

A step 52 comprises the base station receiving the pilot signals from the client device and from further ones of the plurality of client devices. A step 53 comprises the base station measuring channel qualities (e.g. pilot signal level) on the plurality of candidate uplink NB-IoT carriers from receptions of transmissions of the pilot signals. The plurality of client devices comprises one or more active client devices and/or one or more idle client devices. By analyzing the channel qualities, the base station can estimate if and where the 'fade dip' in the uplink is. This 'fade dip' may be on different frequency positon between downlink and uplink for the frequency division duplexing (FDD) communication. While for the Time division duplexing (TDD) communication, there is symmetry between downlink and uplink.

A step 54 comprises selecting a subset of the plurality of the candidate uplink NB-IoT carriers based on the measured channel qualities. Which carriers have been selected may be communicated via a selected/configured downlink carrier. A step 55 comprises scheduling transmissions to the plurality of client devices on the manually configured downlink NB-IoT carrier(s) and transmissions from the plurality of client devices on the selected subset of uplink NB-IoT carriers. Step 55 is performed repeatedly for a certain period, e.g. hours, days, weeks, or months, after which steps 51 to 54 are repeated. Steps 51 to 54 may be performed at the initial deployment of NB-IoT, and optionally repeated afterwards e.g. periodically in order to account for the changes at NB-IoT client devices (e.g. deployment of new NB-IoT client devices and/or movements of existing NB-IoT client devices). Optionally, the periodicity of this scheme may be adapted while the scheme is being performed, e.g. based on an expectation of how quickly there might be (significant) changes at NB-IoT client devices.

The scheduled transmissions take place in time slots 106-119 shown in FIG. 5. In time slots 107-109, the base station transmits data (dd1) to UE1 on manually configured downlink NB-IoT carrier 91. In time slots 111-112, the base station transmits data (dd3) to UE3 on downlink carrier 91. In time slots 116-117, the base station transmits data (dd2) to UE2 on downlink NB-IoT carrier 91. In time slot 109, UE2 transmits data (ud2) to the base station on selected uplink NB-IoT carrier 96. In time slots 114-115, UE1 transmits data (ud1) to the base station on selected uplink NB-IoT carrier 96. In time slots 117-118, UE3 transmits data (ud3) to the base station on selected uplink NB-IoT carrier 96.

In the embodiment of FIG. 5 (and also in the embodiments of FIGS. 6 and 9-12), transmissions to/from UEs are multiplexed in the time domain. In an alternative embodiment, the transmissions to/from UEs are multiplexed in the frequency domain (different subcarriers are used by different UEs), or in both time and frequency domains. In the embodiment of FIG. 5 (and also in the embodiments of FIGS. 6 and 9-12), only a single downlink NB-IoT carrier and a single uplink NB-IoT carrier are used for transmissions to/from UEs. In an alternative embodiment, multiple downlink NB-IoT carriers and/or multiple uplink NB-IoT carriers are used for transmissions to/from UEs.

Figure 4:
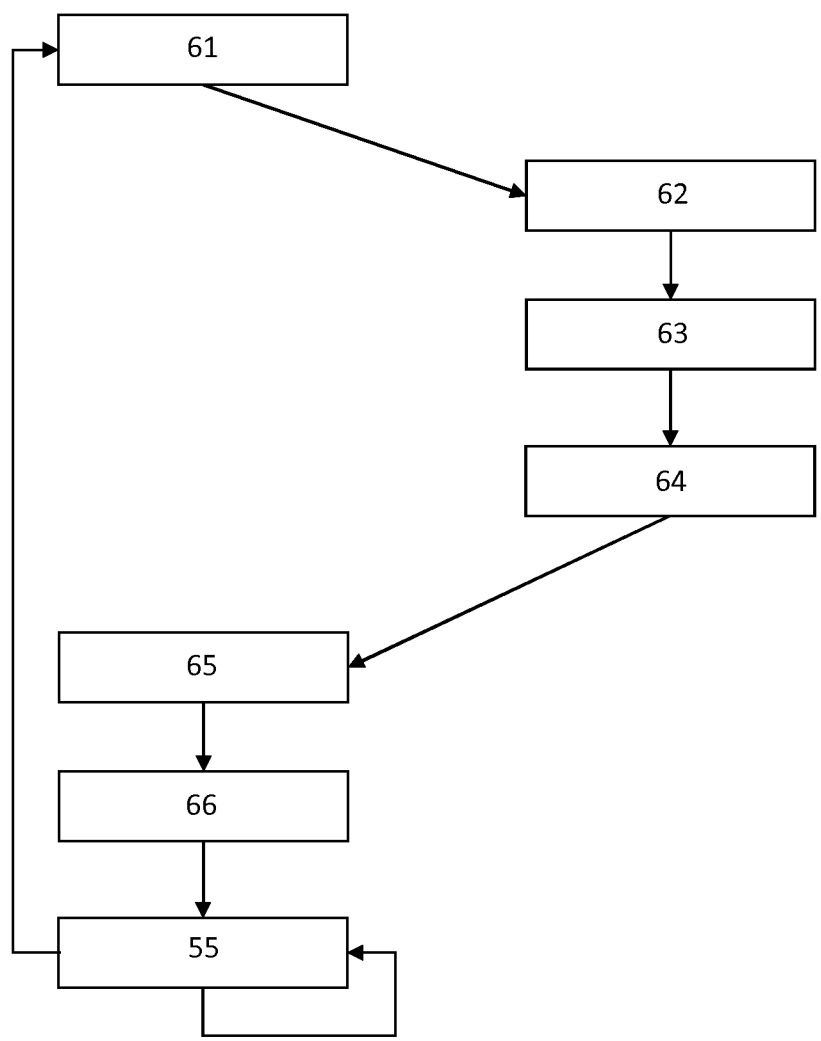
FIG. 4 is a flow diagram of a second embodiment of the methods of the invention.

Second embodiments of the method of scheduling transmissions to client devices and the method of transmitting feedback are shown in FIG. 4. A step 61 comprises a base station transmitting pilot signals to a plurality of client devices on a plurality of candidate downlink NB-IoT carriers. The plurality of client devices comprises one or more active client devices and/or one or more idle client devices. The pilot signals could be LTE Cell Specific Reference Signals or Narrowband Reference Signals (NRS) as specified for NB-IoT, for example.

NB-IoT client devices are currently only able to measure one single downlink PRB (i.e. not multiple PRBs at the same time) due to the reception/transmission bandwidth limit of the receiver, e.g. the receiver is simple, because the client device needs to be low cost. The client devices therefore listen on each of the candidate downlink NB-IoT carriers in sequence. This procedure introduces some overhead in using radio resource and the time spent, as well as overhead for a client device in measuring and reporting. On the other hand, this procedure typically only happens once per e.g. hour, day, week, or a month, so the overhead is manageable. Furthermore, this procedure could be scheduled at a time when there is little traffic in the network (e.g. at night), in order to mitigate the impact.

Figure 6:
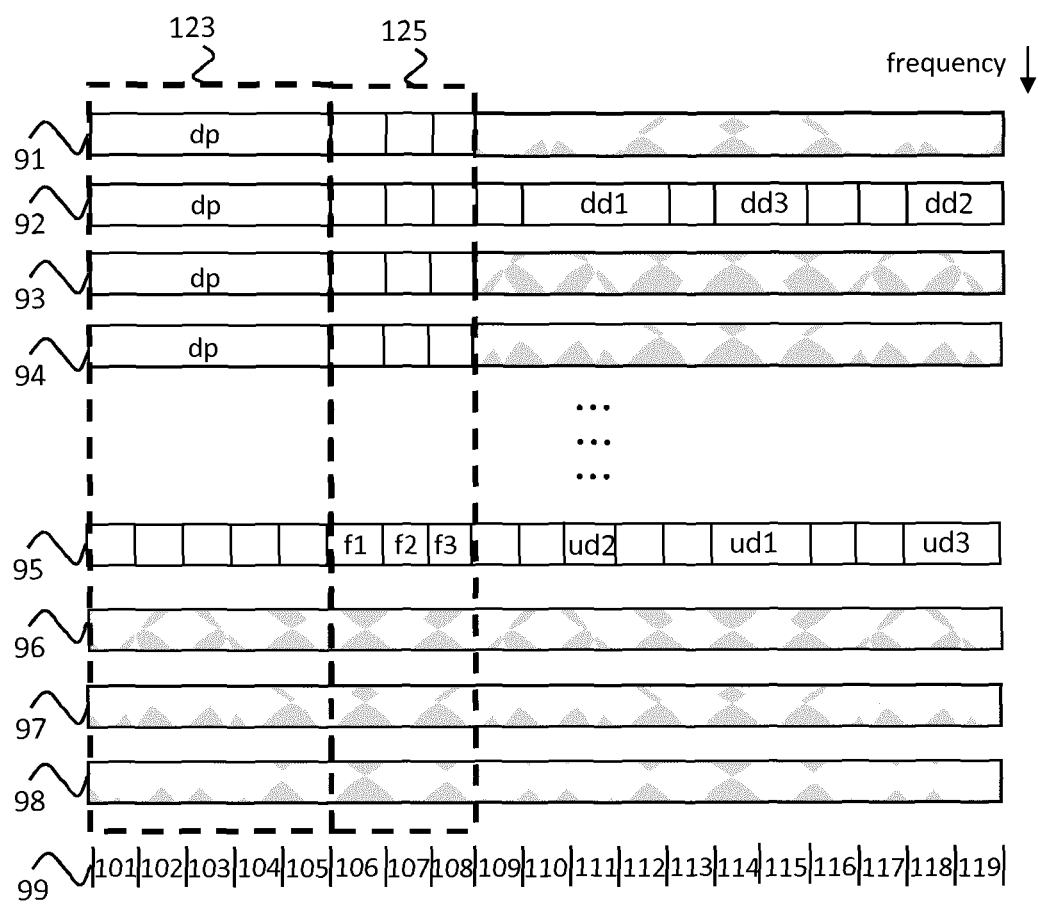
FIG. 6 shows a second example of a resource allocation in relation to FIG. 4.

Step 61 is carried out in stage 123 shown in FIG. 6. Stage 123 corresponds to time slots 101-105 in FIG. 6. In time slots 101-105, the base station transmits a pilot signal (dp) on candidate downlink NB-IoT carrier 91, on candidate downlink NB-IoT carrier 92, on candidate downlink NB-IoT carrier 93 and on candidate downlink NB-IoT carrier 94. In the embodiment of FIG. 6 (and also in the embodiments of FIGS. 9-12), the pilot signal (dp) is transmitted on all of the candidate downlink NB-IoT carriers simultaneously. In an alternative embodiment, the pilot signal (dp) is transmitted on the candidate downlink NB-IoT carriers in sequence or according to another schedule. This may result in a more efficient use of resources. The schedule for transmitting the pilot signal (dp) may be standardized or communicated by the base station to the UEs, for example.

A step 62 comprises a client device receiving these pilot signals. A step 63 comprises the client device measuring at least one channel quality of at least one of the plurality of candidate downlink NB-IoT carriers from at least one reception of at least one transmission by the base station on the plurality of candidate downlink NB-IoT carriers. A step 64 comprises transmitting feedback based on one or more of the at least one measured channel quality to the base station on a single, manually configured uplink NB-IoT carrier.

Step 64 is carried out in stage 125 shown in FIG. 6. Stage 125 corresponds to time slots 106-108 in FIG. 6. In time slot 106, UE1 transmits its feedback (f1) to the base station on manually configured uplink NB-IoT carrier 95. In time slot 107, UE2 transmits its feedback (f2) to the base station on uplink NB-IoT carrier 95. In time slot 108, UE3 transmits its feedback (f3) to the base station on uplink NB-IoT carrier 95. In the embodiment of FIG. 4, illustrated in FIG. 6, the feedback identifies which one or more of candidate downlink NB-IoT carriers 91-94 is or are preferred by the client device. The period in which stages 123 and 125 take place may be pre-configured in the base station and in the client devices or communicated by the base station to the client devices, for example. In the embodiment of FIG. 6, the feedback transmitted by the UEs is multiplexed in the time domain. In an alternative embodiment, the feedback transmitted by the UEs is multiplexed in the frequency domain (different subcarriers are used by different UEs), or in both time and frequency domains.

A step 65 comprises the base station receiving this feedback from the client device and receiving further feedback from the further ones of the plurality of client devices. A step 66 comprises selecting a subset of the plurality of candidate downlink NB-IoT carriers based on the received feedback. Step 55 comprises scheduling transmissions to the plurality of client devices on the selected subset of candidate downlink NB-IoT carriers and transmissions from the plurality of client devices on the manually configured uplink NB-IoT carrier(s).

The scheduled transmissions take place in time slots 109-119 shown in FIG. 6. In time slots 110-112, the base station transmits data (dd1) to UE1 on selected downlink NB-IoT carrier 92. In time slots 114-115, the base station transmits data (dd3) to UE3 on selected downlink NB-IoT carrier 92. In time slots 118-119, the base station transmits data (dd2) to UE2 on selected downlink NB-IoT carrier 92. In time slot 111, UE2 transmits data (ud2) to the base station on manually configured uplink NB-IoT carrier 95. In time slots 114-115, UE1 transmits data (ud1) to the base station on manually configured uplink NB-IoT carrier 95. In time slots 118-119, UE3 transmits data (ud3) to the base station on manually configured uplink NB-IoT carrier 95.

Figure 7:
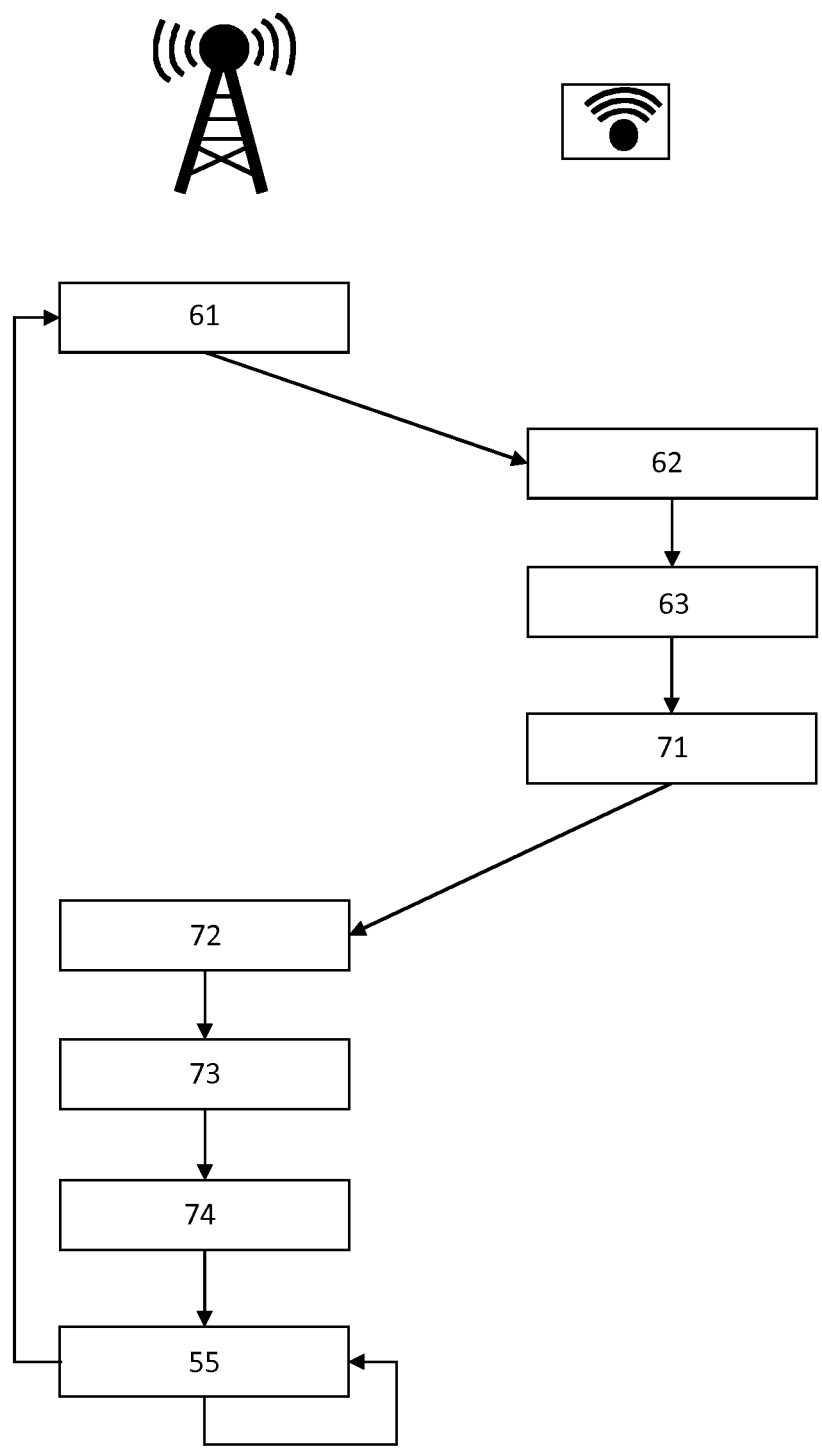
FIG. 7 is a flow diagram of a third embodiment of the methods of the invention.

Third embodiments of the method of scheduling transmissions to client devices and the method of transmitting feedback are shown in FIG. 7. Steps 61, 62 and 63 are the same as in FIG. 4. However, step 64 of FIG. 4 has been replaced with a step 71 in FIG. 7. Step 71 comprises transmitting feedback based on one or more of the at least one measured channel quality of at least one of the plurality of candidate downlink NB-IoT carriers to the base station on a plurality of candidate uplink NB-IoT carriers.

Figure 9:
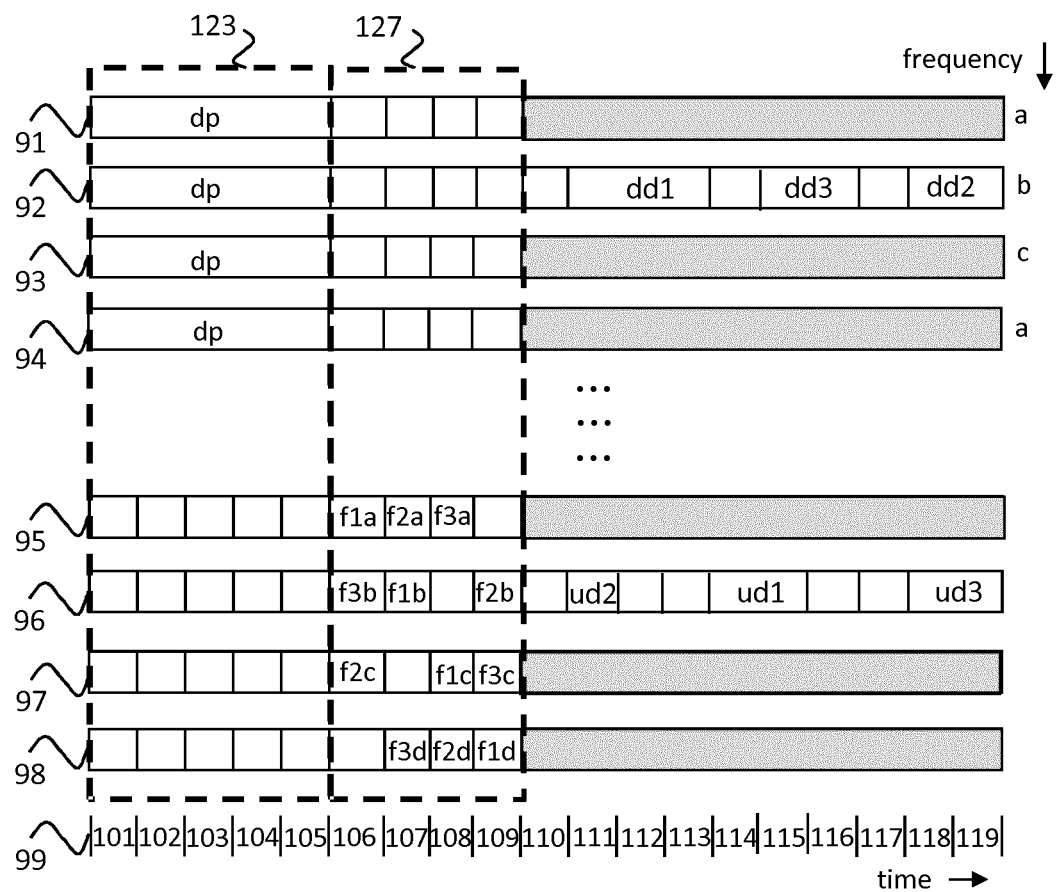
FIG. 9 shows a third example of a resource allocation in relation to FIG. 7.

Step 71 is carried out in stage 127 shown in FIG. 9. Stage 127 corresponds to time slots 106-109 in FIG. 9. In time slot 106, UE1 transmits its feedback relating to candidate downlink carrier 91 (f1a) to the base station on candidate uplink NB-IoT carrier 95, UE3 transmits its feedback to candidate downlink carrier 92 (f3b) to the base station on candidate uplink NB-IoT carrier 96 and UE2 transmits its feedback relating to candidate downlink NB-IoT carrier 93 (f2c) to the base station on candidate uplink NB-IoT carrier 97. In time slot 107, UE2 transmits its feedback relating to candidate downlink NB-IoT carrier 91 (f2a) to the base station on candidate uplink NB-IoT carrier 95, UE1 transmits its feedback relating to candidate downlink NB-IoT carrier 92 (f1b) to the base station on candidate uplink NB-IoT carrier 96 and UE3 transmits its feedback relating to candidate downlink NB-IoT carrier 94 (f3d) to the base station on candidate uplink NB-IoT carrier 98.

In time slot 108, UE3 transmits its feedback relating to candidate downlink carrier 91 (f3a) to the base station on candidate uplink NB-IoT carrier 95, UE1 transmits its feedback relating to candidate downlink NB-IoT carrier 93 (f1c) to the base station on candidate uplink NB-IoT carrier 97 and UE2 transmits its feedback relating to candidate downlink NB-IoT carrier 94 (f2d) to the base station on candidate uplink NB-IoT carrier 98. In time slot 109, UE2 transmits its feedback relating to candidate downlink NB-IoT carrier 92 (f2b) to the base station on candidate uplink NB-IoT carrier 96, UE3 transmits its feedback relating to candidate downlink NB-IoT carrier 93 (f3c) to the base station on candidate uplink NB-IoT carrier 97 and UE1 transmits its feedback relating to candidate downlink NB-IoT carrier 94 (f1d) to the base station on candidate uplink NB-IoT carrier 98. In the embodiment of FIG. 7, illustrated in FIG. 9, the feedback comprises the Received Signal Received Power (RSRP) of a single downlink carrier. In an alternative embodiment, the feedback additionally or alternatively comprises other performance metrics like RSRQ, CQI, SNR, SINR.

A step 72 comprises the base station receiving the feedback from the client devices on the plurality of candidate uplink NB-IoT carriers. A step 73 comprises the base station measuring channel qualities on the plurality of candidate uplink NB-IoT carriers from receptions of the feedback from the plurality of client devices. A step 74 comprises selecting a subset of the plurality of candidate downlink NB-IoT carriers and a subset of the plurality of candidate uplink NB-IoT carriers based on the received feedback and the measured channel qualities.

Step 55 comprises scheduling transmissions to the plurality of client devices on the selected subset of candidate downlink NB-IoT carriers and transmissions from the plurality of client devices on the selected subset of candidate uplink NB-IoT carriers. In the embodiment of FIG. 7, the uplink NB-IoT carriers and the downlink NB-IoT carriers are paired, i.e. an uplink NB-IoT carrier has a pre-defined relative frequency position to the downlink NB-IoT carrier (where the base station has transmitted the pilot signal). In this case, the base station implicitly knows for which downlink carrier the feedback received in step 72 is.

The scheduled transmissions take place in time slots 110-119 shown in FIG. 9. In time slots 111-113, the base station transmits data (dd1) to UE1 on selected downlink NB-IoT carrier 92. In time slots 115-116, the base station transmits data (dd3) to UE3 on selected downlink NB-IoT carrier 92. In time slots 118-119, the base station transmits data (dd2) to UE2 on selected downlink NB-IoT carrier 92. In time slot 111, UE2 transmits data (ud2) to the base station on selected uplink NB-IoT carrier 96. In time slots 114-115, UE1 transmits data (ud1) to the base station on selected uplink NB-IoT carrier 96. In time slots 118-119, UE3 transmits data (ud3) to the base station on selected uplink NB-IoT carrier 96.

Figure 8:
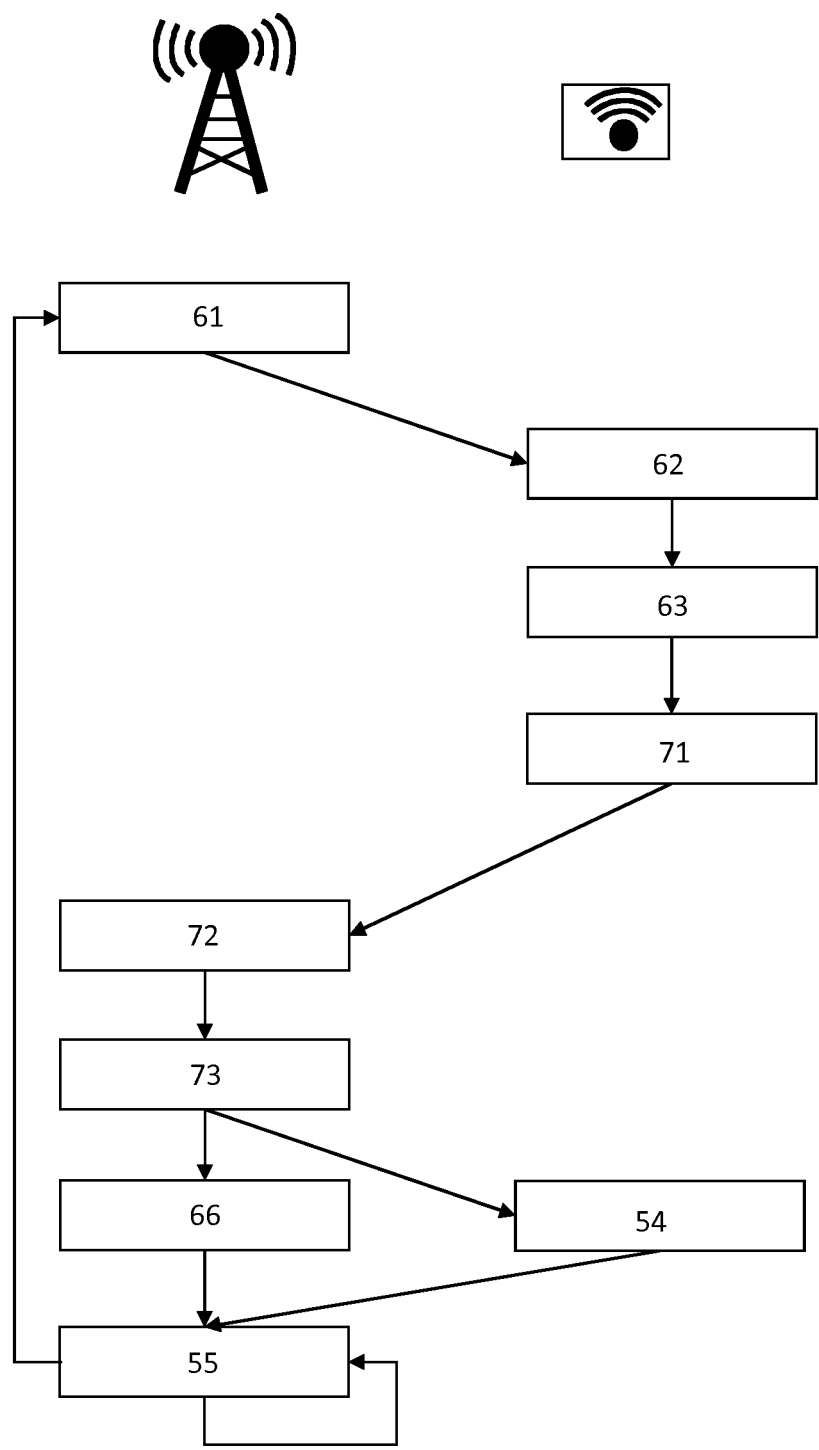
FIG. 8 is a flow diagram of a fourth embodiment of the methods of the invention.

Fourth embodiments of the method of scheduling transmissions to client devices and the method of transmitting feedback are shown in FIG. 8. In these fourth embodiments, the uplink NB-IoT carriers and the downlink NB-IoT carriers are not paired, i.e. there is no uplink NB-IoT carrier that has a one-to-one relation with the downlink carrier where the base station has transmitted the pilot signal. Steps 61 to 63, steps 71 to 73 and step 55 are the same as in FIG. 7. Step 74 of FIG. 7 has been replaced with step 54 of FIG. 3 and step 66 of FIG. 4. Since the uplink NB-IoT carriers and the downlink NB-IoT carriers are not paired, they are selected separately, which may result in better performance. This is illustrated in FIG. 10.

Figure 10:
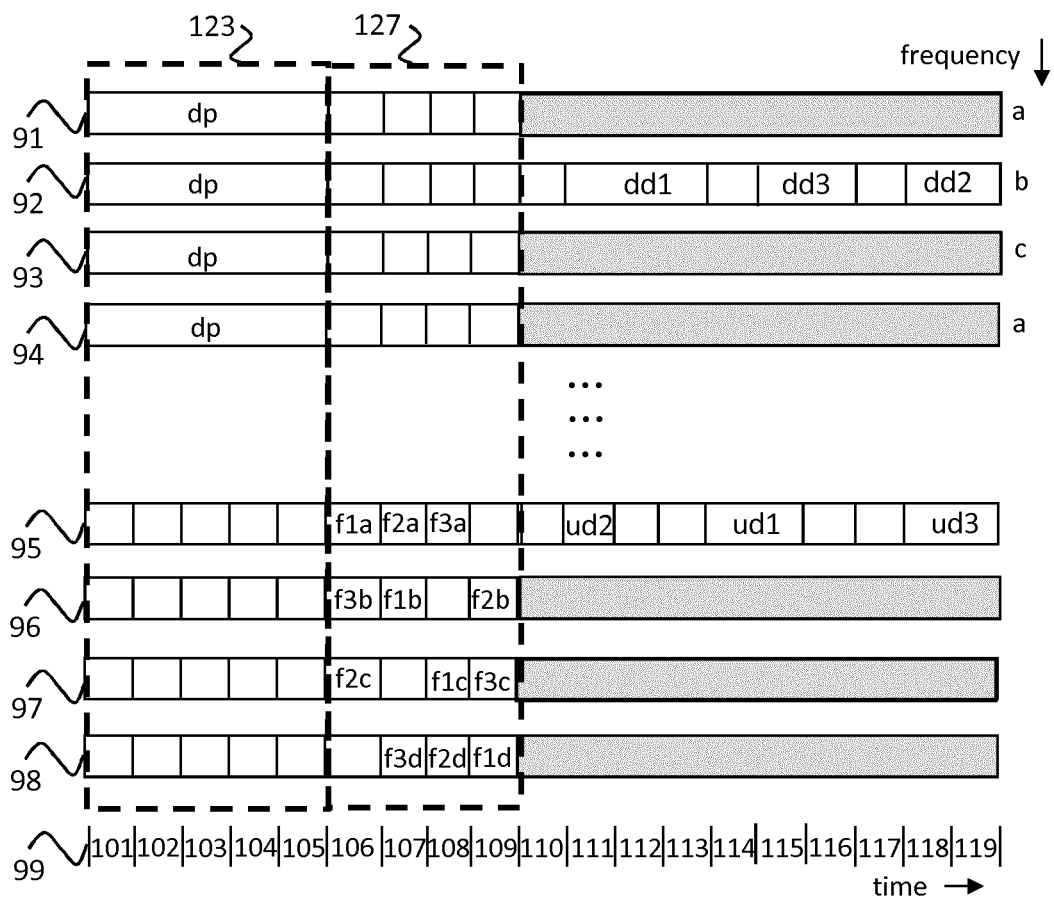
FIG. 10 shows a fourth example of a resource allocation in relation to FIG. 8.

The difference between FIGS. 9 and 10 is that in FIG. 10, candidate uplink NB-IoT carrier 95 has been selected instead of candidate uplink NB-IoT carrier 96. In FIG. 9, downlink NB-IoT carrier 91 is paired with uplink NB-IoT carrier 95, downlink carrier 92 is paired with uplink NB-IoT carrier 96, downlink NB-IoT carrier 93 is paired with uplink NB-IoT carrier 97, and downlink NB-IoT carrier 94 is paired with uplink NB-IoT carrier 98. Thus, the selected downlink NB-IoT carrier 92 and the selected uplink NB-IoT carrier 96 of FIG. 9 are paired and the selected downlink NB-IoT carrier 92 and the selected uplink NB-IoT carrier 95 of FIGS. 10-12 are not paired.

In time slot 111 of FIG. 10, UE2 transmits data (ud2) to the base station on selected uplink NB-IoT carrier 95. In time slots 114-115 of FIG. 10, UE1 transmits data (ud1) to the base station on selected uplink NB-IoT carrier 95. In time slots 118-119 of FIG. 10, UE3 transmits data (ud3) to the base station on selected uplink NB-IoT carrier 95. In FIG. 10, the feedback transmitted by the client devices in stage 127 is the same as in FIG. 9. Although the selected downlink NB-IoT carrier 92 and the selected uplink NB-IoT carrier 95 are not paired, the pairing between downlink NB-IoT carriers and uplink NB-IoT carriers is used in stage 127 in FIG. 10.

Figure 11:
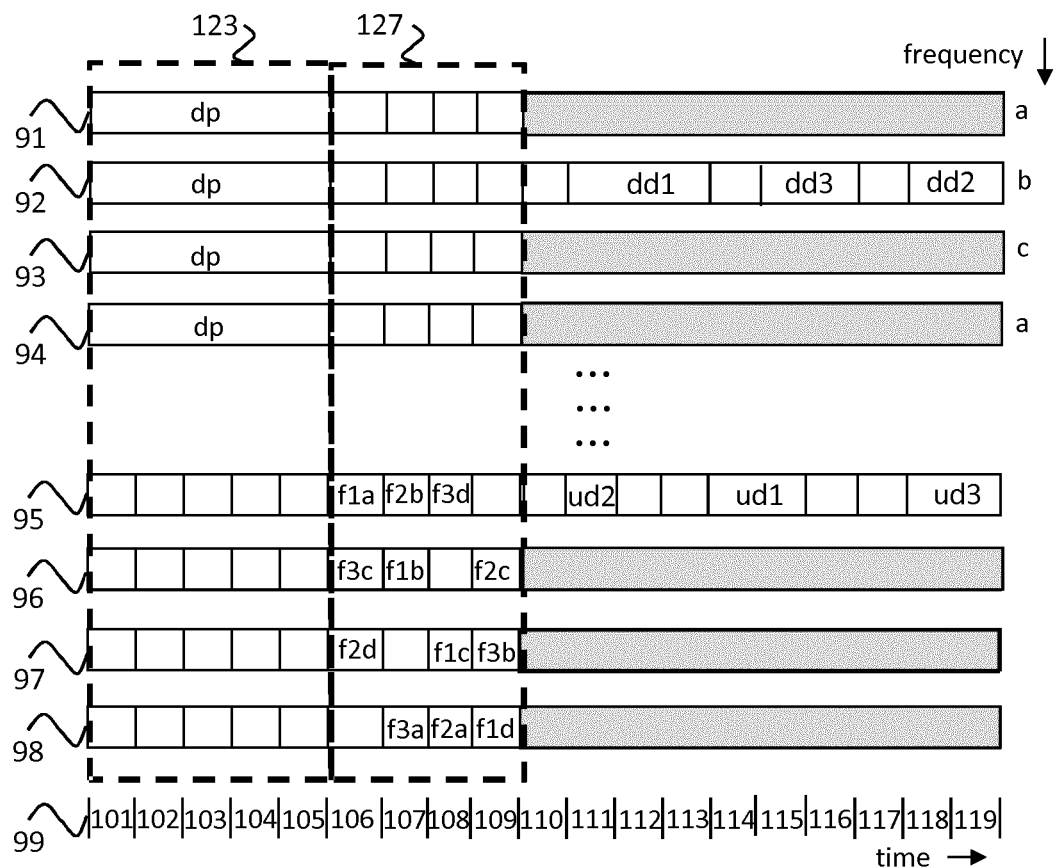
FIG. 11 shows a fifth example of a resource allocation in relation to FIG. 8.
Figure 12:
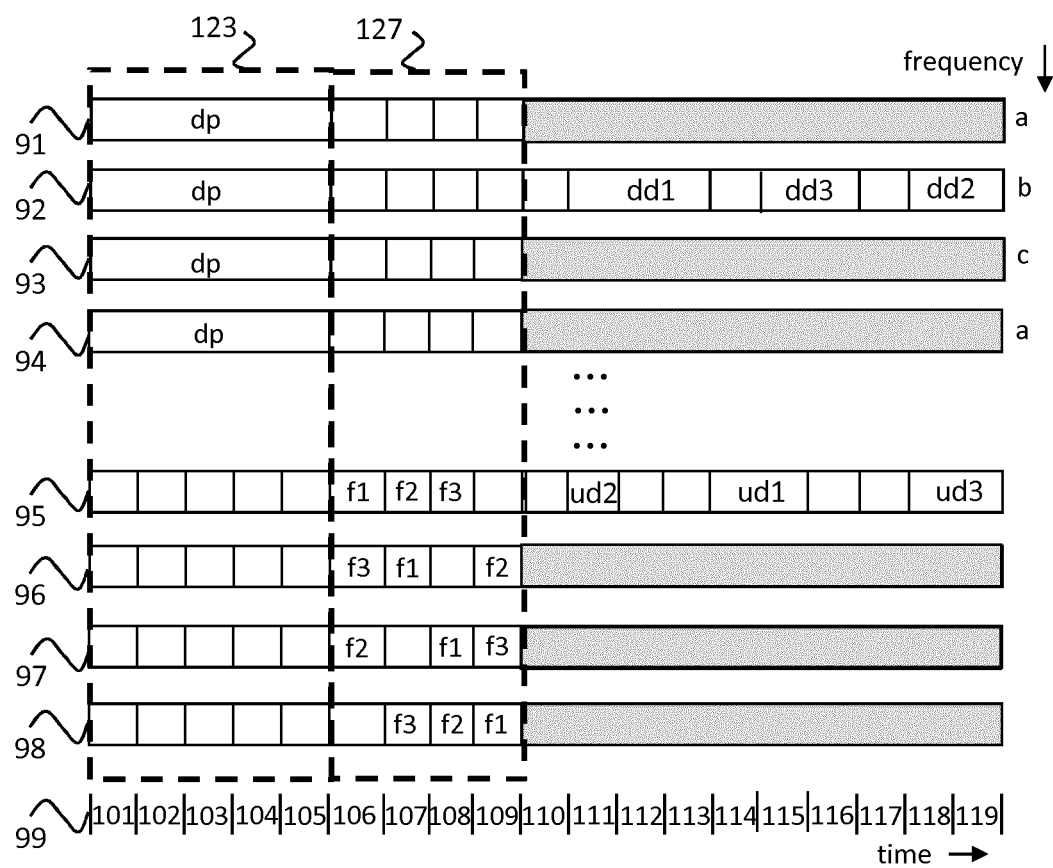
FIG. 12 shows a sixth example of a resource allocation in relation to FIG. 8.

In FIGS. 11-12, the pairing between downlink NB-IoT carriers and uplink NB-IoT carriers is not used in stage 127. In FIG. 11, the feedback transmitted on an uplink NB-IoT carrier does not relate to a paired downlink NB-IoT carrier, but identifies to which downlink NB-IoT carrier it does relate. Like in FIGS. 9 and 10, the feedback comprises the Received Signal Received Power (RSRP) of a single downlink NB-IoT carrier. In an alternative embodiment, the feedback additionally or alternatively comprises other performance metrics like RSRQ, CQI, SNR, SINR.

In time slot 106 of FIG. 11, UE1 transmits its feedback relating to candidate downlink NB-IoT carrier 91 (f1a) to the base station on candidate uplink NB-IoT carrier 95, UE3 transmits its feedback relating to candidate downlink NB-IoT carrier 93 (f3c) to the base station on candidate uplink NB-IoT carrier 96 and UE2 transmits its feedback relating to candidate downlink NB-IoT carrier 94 (f2d) to the base station on candidate uplink NB-IoT carrier 97. In time slot 107 of FIG. 11, UE2 transmits its feedback relating to candidate downlink NB-IoT carrier 92 (f2b) to the base station on candidate uplink NB-IoT carrier 95, UE1 transmits its feedback relating to candidate downlink NB-IoT carrier 92 (f1b) to the base station on candidate uplink NB-IoT carrier 96 and UE3 transmits its feedback relating to candidate downlink NB-IoT carrier 91 (f3a) to the base station on candidate uplink NB-IoT carrier 98.

In time slot 108 of FIG. 11, UE3 transmits its feedback relating to candidate downlink NB-IoT carrier 94 (f3d) to the base station on candidate uplink NB-IoT carrier 95, UE1 transmits its feedback relating to candidate downlink NB-IoT carrier 93 (f1c) to the base station on candidate uplink NB-IoT carrier 97 and UE2 transmits its feedback relating to candidate downlink NB-IoT carrier 91 (f2a) to the base station on candidate uplink NB-IoT carrier 98. In time slot 109 of FIG. 11, UE2 transmits its feedback relating to candidate downlink NB-IoT carrier 93 (f2c) to the base station on candidate uplink NB-IoT carrier 96, UE3 transmits its feedback relating to candidate downlink NB-IoT carrier 92 (f3b) to the base station on candidate uplink NB-IoT carrier 97 and UE1 transmits its feedback relating to candidate downlink NB-IoT carrier 94 (f1d) to the base station on candidate uplink NB-IoT carrier 98.

In FIG. 12, the feedback transmitted on a candidate uplink NB-IoT carrier identifies which one or more of candidate downlink NB-IoT carriers 91-94 is or are preferred by the client device, like in FIG. 6. However, since feedback should be transmitted on multiple candidate uplink NB-IoT carriers, a client device transmits the same feedback on all the candidate uplink NB-IoT carriers 95-98. UE1 transmits its feedback on candidate uplink NB-IoT carrier 95 in time slot 106, on candidate uplink NB-IoT carrier 96 in time slot 107, on candidate uplink NB-IoT carrier 97 in time slot 108 and on candidate uplink NB-IoT carrier 98 in time slot 109.

UE2 transmits its feedback on candidate uplink NB-IoT carrier 95 in time slot 107, on candidate uplink NB-IoT carrier 96 in time slot 109, on candidate uplink NB-IoT carrier 97 in time slot 106 and on candidate uplink NB-IoT carrier 98 in time slot 108. UE3 transmits its feedback on candidate uplink NB-IoT carrier 95 in time slot 108, on candidate uplink NB-IoT carrier 96 in time slot 106, on candidate uplink NB-IoT carrier 97 in time slot 109 and on candidate uplink NB-IoT carrier 98 in time slot 107.

FIGS. 5-6 and 9-12 show the use of Frequency Division Multiplexing (FDD). In an alternative embodiment, Time Division Multiplexing (TDD) is used. In this alternative embodiment, the same frequency resources are used for both uplink and downlink and downlink and uplink frequency resources thus do not need to be paired.

Step 54 of FIGS. 3 and 8, step 66 of FIGS. 4 and 8, and step 74 of FIG. 7 at least comprise selecting one or more NB-IoT anchor carriers and may optionally comprise selecting one or more NB-IoT non-anchor carriers. The base station/network may perform this selection, for example, by first determining for each candidate carrier how many of the client devices can be served on this candidate carrier (e.g. by determining whether a determined RSRP in the downlink or a measured signal strength in the uplink exceeds a certain threshold).

For example, a first candidate downlink carrier may be able to serve 85% of the client devices, a second candidate downlink carrier may be able to serve 82% of the client devices, a third candidate downlink carrier may be able to serve 78% of the client devices, and a fourth candidate downlink carrier may be able to serve 74% of the client devices. A first candidate uplink carrier may be able to serve 83% of the client devices, a second candidate uplink carrier may be able to serve 80% of the client devices, a third candidate uplink carrier may be able to serve 79% of the client devices, and a fourth candidate uplink carrier may be able to serve 76% of the client devices.

A single downlink carrier and/or a single uplink carrier may be selected or multiple downlink carriers and/or multiple uplink carriers may be selected. In the former case, the selected downlink carrier may be the first candidate downlink carrier (serving 85% of the client devices) and/or the selected uplink carrier may be the first candidate uplink carrier (serving 83% of the client devices), for example.

In the latter case, the base station/network may use, for example, one of the following criteria for selecting multiple carriers based on the determined information:

A. The base station/network selects the M downlink carriers (of which at least one is an anchor carrier) and/or uplink carriers (of which at least one is an anchor carrier) which together serve all the NB-IoT client devices, or as many of the NB-IoT client devices as possible. For example, the first and the fourth candidate downlink carriers are selected, because together they serve 95% of the client devices, while the first and the second candidate downlink carriers together serve, 90% of the client devices, and/or the first and the third candidate uplink carriers are selected, because together they serve 90% of the client devices, while the first and the second candidate uplink carriers together serve, 85% of the client devices.

B. The base station/network selects the M downlink carriers (of which at least one is an anchor carrier) and/or uplink carriers (of which at least one is an anchor carrier) which are ranked the highest. For example, the first candidate downlink carrier and the second candidate downlink carrier are selected and/or the first candidate uplink carrier and the second candidate uplink carrier are selected, because they are ranked highest according to the percentage of served client devices.

When determining how many client devices can be served with a candidate downlink carrier, it may be taken into account whether these client devices can be served by the statically configured uplink carriers or candidate uplink carriers. When determining how many client devices can be served with a candidate uplink carrier, it may be taken into account whether these client devices can be served by the statically configured downlink carriers or candidate downlink carriers. For example, the first candidate uplink carrier and the first candidate downlink carrier might together be able to serve 75% of the client devices in both uplink and downlink, while the second candidate downlink carrier and the second candidate uplink carrier might together be able to serve 80% of the client devices in both uplink and downlink. In this case, the latter combination may be preferred.

A combined quality of a paired downlink frequency resource and uplink frequency resource may be determined in one of the following ways, for example:

1. Determining the sum of the number of served client devices in the downlink and the number of served client devices in the uplink
2. Determining the number of served client devices in the downlink, with the condition that the number of client devices served by the paired uplink carrier is no lower than a pre-defined threshold
3. Determining the number of served client devices in the uplink, with the condition that the number of client devices served by the paired downlink carrier is no lower than a pre-defined threshold The measurements performed in step 53 of FIG. 3 and step 73 of FIGS. 7 and 8 and the feedback received in steps 65 of FIG. 4 and step 72 of FIGS. 7 and 8 may be used in step 55 to determine which time-frequency resources to allocate to a client device if multiple downlink NB-IoT carriers and/or multiple downlink NB-IoT have been selected/configured.

Figure 13:
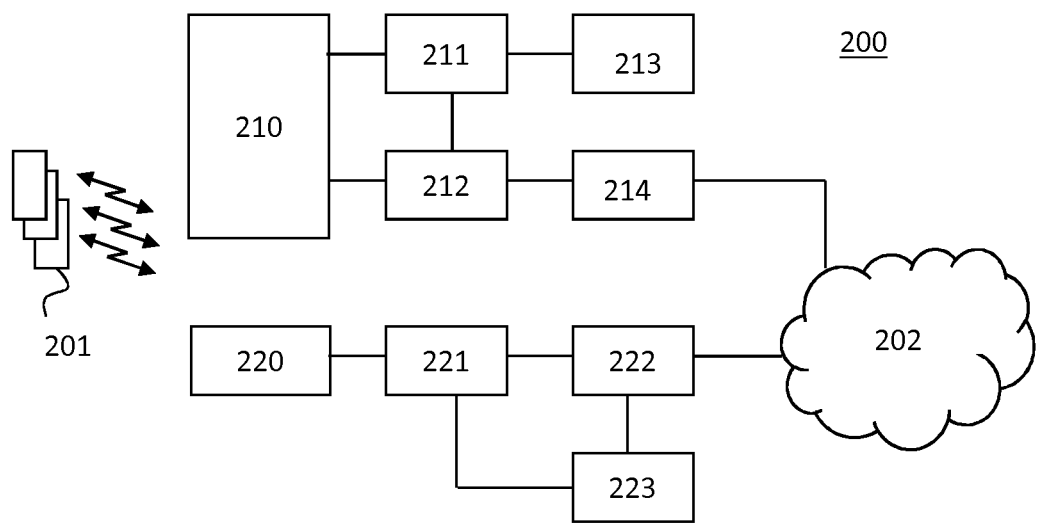
FIG. 13 is a block diagram of an exemplary cellular telecommunication system used in an embodiment of the device and the system of the invention.

In the telecommunications system 200 of FIG. 13, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 13 represents a GSM/GPRS or UMTS network.

For a GSM/GPRS network, a radio access network (RAN) system 220 comprises a plurality of nodes, including base stations (combination of a BSC and a BTS), not shown individually in FIG. 13. The core network system comprises a Gateway GPRS Support Node 222 (GGSN), a Serving GPRS Support Node 221 (SGSN, for GPRS) or Mobile Switching Centre (MSC, for GSM, not shown in FIG. 6) and a Home Location Register 223 (HLR). The HLR 223 contains subscription information for user devices 201, e.g. mobile stations MS.

For a UMTS radio access network (UTRAN), the radio access network system 220 also comprises a Radio Network Controller (RNC) connected to a plurality of base stations (NodeBs), also not shown individually in FIG. 13. In the core network system, the GGSN 222 and the SGSN 221/MSC are connected to the HLR 223 that contains subscription information of the user devices 201, e.g. user equipment UE.

The upper branch of the telecommunications system in FIG. 13 represents a next generation network, commonly indicated as Long Term Evolution (LTE) system or Evolved Packet System (EPS).

The radio access network system 210 (E-UTRAN), comprises base stations (evolved NodeBs, eNodeBs or eNBs), not shown individually in FIG. 13, providing cellular wireless access for a user device 201, e.g. user equipment UE. The core network system comprises a PDN Gateway (P-GW) 214 and a Serving Gateway 212 (S-GW). The E-UTRAN 210 of the EPS is connected to the S-GW 212 via a packet network. The S-GW 212 is connected to a Home Subscriber Server HSS 213 and a Mobility Management Entity MME 211 for signalling purposes. The HSS 213 includes a subscription profile repository SPR for user devices 201.

For GPRS, UMTS and LTE systems, the core network system is generally connected to a further packet network 202, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 14:
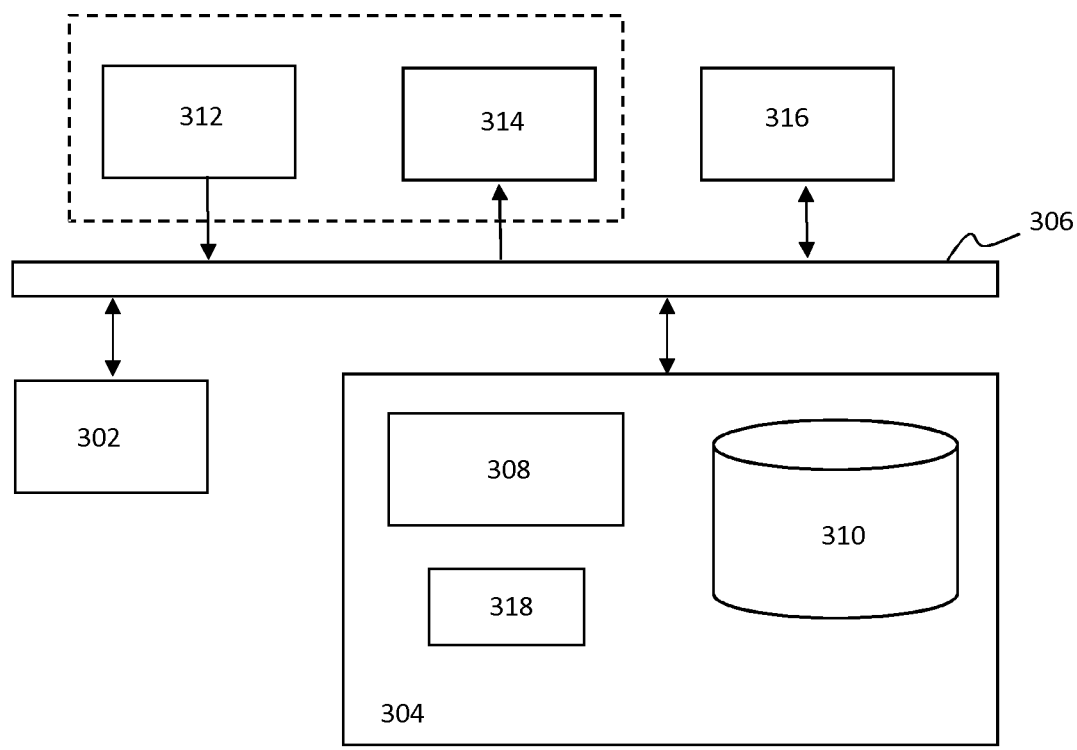
FIG. 14 is a block diagram of an exemplary data processing system for performing the methods of the invention.

FIG. 14 depicts a block diagram illustrating an exemplary data processing system that may perform the methods as described with reference to FIGS. 3-4 and 7-8.

As shown in FIG. 14, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 14 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 14, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 14) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for scheduling transmissions to client devices, comprising:
   at least one receiver; and
   at least one processor configured to:
      use said at least one receiver to receive feedback about a plurality of candidate downlink frequency resources from a plurality of client devices and/or measure channel qualities of a plurality of candidate uplink frequency resources from receptions of transmissions by said plurality of client devices,
      select a subset of said plurality of candidate downlink frequency resources and/or a subset of said plurality of candidate uplink frequency resources based on said received feedback and/or said measured channel qualities, and
      schedule transmissions to said plurality of client devices on said selected subset of candidate downlink frequency resources and/or transmissions from said plurality of client devices on said selected subset of uplink frequency resources.

2. A system as claimed in claim 1, wherein said at least one processor is configured to use said at least one receiver to receive said feedback about said plurality of candidate downlink frequency resources on said plurality of candidate uplink frequency resources and measure said channel quality of said plurality of candidate uplink frequency resources from receptions of said feedback on said plurality of candidate uplink frequency resources.

3. A system as claimed in claim 1, wherein at least one of said plurality of candidate downlink frequency resources is paired with at least one of said plurality of candidate uplink frequency resources and said at least one processor is configured to use said at least one receiver to receive said feedback about said at least one candidate downlink frequency resource on the at least one candidate uplink frequency resource paired with said at least one candidate downlink frequency resource.

4. A system as claimed in claim 1, wherein said feedback comprises an identification of one or more candidate downlink frequency resources to which said feedback relates.

5. A system as claimed in claim 1, wherein at least one of said plurality of candidate downlink frequency resources is paired with at least one of said plurality of candidate uplink frequency resources and said at least one processor is configured to determine at least one combined quality for at least one pair of candidate downlink and uplink frequency resources and select a subset of said plurality of candidate downlink frequency resources and a subset of said plurality of candidate uplink frequency resources based on said at least one combined quality.

6. A system-as claimed in claim 1, wherein said at least one processor is further configured to schedule transmissions to a mobile client device on said selected subset of candidate downlink frequency resources and/or transmissions from said mobile client device on said selected subset of uplink frequency resources, said selected subset of candidate downlink frequency resources not being based on feedback received from said mobile client device and/or said selected subset of candidate uplink frequency resources not being based on a channel quality measured from a reception of a transmission by said mobile client device.

7. A system as claimed in claim 1, wherein said system further comprises at least one transmitter and said at least one processor is configured to use said at least one transmitter to transmit wireless signals on said plurality of candidate downlink frequency resources.

8. A system as claimed in claim 7, wherein said wireless signals transmitted by said at least one processor using said at least one transmitter on said plurality of candidate downlink frequency resources are pilot signals.

9. A system as claimed in claim 7, wherein said at least one processor is configured to use said at least one transmitter to inform said plurality of client devices of at least one time at which it will start transmitting said wireless signals on said plurality of candidate downlink frequency resources.

10. A client device for transmitting feedback, said client device comprising:
   at least one receiver;
   at least one transmitter; and
   at least one processor configured to:
      use said at least one receiver to measure at least one channel quality of at least one candidate downlink frequency resource from at least one reception of at least one transmission by a transmitting system on said at least one candidate downlink frequency resource, and
      use said at least one transmitter to transmit feedback based on one or more of said at least one measured channel quality to said transmitting system on a plurality of candidate uplink frequency resources.

11. A method of scheduling transmissions to client devices, comprising:
   receiving feedback, about a plurality of candidate downlink frequency resources from a plurality of client devices and/or measuring channel qualities of a plurality of candidate uplink frequency resources from receptions of transmissions by said plurality of client devices;
   selecting a subset of said plurality of candidate downlink frequency resources and/or a subset of said plurality of said candidate uplink frequency resources based on said received feedback and/or said measured channel qualities; and
   scheduling transmissions to said plurality of client devices on said selected subset of candidate downlink frequency resources and/or transmissions from said plurality of client devices on said selected subset of uplink frequency resources.

12. A method of transmitting feedback, comprising:
   measuring at least one channel quality of at least one candidate downlink frequency resource from at least one reception of at least one transmission by a transmitting system on said at least one candidate downlink frequency resource; and
   transmitting feedback based on one or more of said at least one measured channel quality to said transmitting system on a plurality of candidate uplink frequency resources.

13. A non-transitory computer-readable medium comprising a computer program, the computer program comprising instructions for causing a processor system to perform the method of claim 11.

14. A non-transitory computer-readable medium comprising a computer program, the computer program comprising instructions for causing a processor system to perform the method of claim 12.

* * * * *